(12) United States Patent
Simmons

(10) Patent No.: US 10,754,457 B2
(45) Date of Patent: Aug. 25, 2020

(54) TOUCH-SCREEN PANEL WITH MULTIPLE SENSE UNITS AND RELATED METHODS

(71) Applicant: Neodrón Limited, Dublin (IE)

(72) Inventor: Martin J. Simmons, Whiteley (GB)

(73) Assignee: Neodrón Limited, Dublin (IE)

( * ) Notice: Subject to any disclaimer, the term of this patent is extended or adjusted under 35 U.S.C. 154(b) by 0 days.

(21) Appl. No.: 16/243,474

(22) Filed: Jan. 9, 2019

(65) Prior Publication Data
US 2019/0220111 A1    Jul. 18, 2019

Related U.S. Application Data

(63) Continuation of application No. 14/448,472, filed on Jul. 31, 2014, now Pat. No. 10,185,417, which is a continuation of application No. 12/816,900, filed on Jun. 16, 2010, now Pat. No. 8,797,281.

(51) Int. Cl.
  *G06F 3/041*    (2006.01)
  *G06F 3/044*    (2006.01)

(52) U.S. Cl.
  CPC .............. *G06F 3/041* (2013.01); *G06F 3/044* (2013.01); *G06F 3/0416* (2013.01)

(58) Field of Classification Search
  CPC ......... G06F 3/0416; G06F 3/041; G06F 3/044
  USPC .................................................. 345/173, 174
  See application file for complete search history.

(56) References Cited

U.S. PATENT DOCUMENTS

| | | | |
|---|---|---|---|
| 6,961,049 B2 | 11/2005 | Mulligan et al. | |
| 7,663,607 B2 | 2/2010 | Hotelling et al. | |
| 7,864,503 B2 | 1/2011 | Chang | |
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |
| 8,089,472 B2 * | 1/2012 | XiaoPing ............... | G06F 3/0362 178/18.06 |
| 8,144,125 B2 * | 3/2012 | Peng ....................... | G06F 3/044 178/18.01 |
| 8,144,126 B2 | 3/2012 | Wright | |
| 8,149,226 B2 * | 4/2012 | Oki ......................... | G06F 3/044 178/18.01 |
| 8,179,381 B2 | 5/2012 | Frey et al. | |
| 8,217,902 B2 | 7/2012 | Chang et al. | |
| 8,723,824 B2 | 5/2014 | Myers et al. | |
| 2008/0309635 A1 | 12/2008 | Matsuo | |

(Continued)

FOREIGN PATENT DOCUMENTS

WO    2012129247 A2    9/2012

OTHER PUBLICATIONS

Amendment After Non-Final, U.S. Appl. No. 12/816,900, dated May 28, 2013, 17 pages.

(Continued)

*Primary Examiner* — Kwang-Su Yang
(74) *Attorney, Agent, or Firm* — Shami Messinger PLLC

(57) ABSTRACT

This document discloses, systems, methods, and articles of manufacture, related to position sensors and uses of such sensors. Multiple panels can be arranged in close proximity to one another and one or more sense or drives lines associated with each respective panel can be associated with a control circuit of the other adjacent panel.

11 Claims, 14 Drawing Sheets

(56) References Cited

U.S. PATENT DOCUMENTS

| | | |
|---|---|---|
| 2009/0066669 A1 | 3/2009 | Olson |
| 2009/0085891 A1 | 4/2009 | Yang et al. |
| 2009/0315854 A1 | 12/2009 | Matsuo |
| 2010/0259504 A1* | 10/2010 | Doi .................. G06F 3/0418 345/174 |
| 2011/0073384 A1 | 3/2011 | Osoinach et al. |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2013/0076612 A1 | 3/2013 | Myers |

OTHER PUBLICATIONS

Amendment After Non-Final, U.S. Appl. No. 12/816,900, dated Sep. 12, 2013, 6 Pages.
Decision on Appeal, Appeal 2018-002171 PTAB, U.S. Appl. No. 14/448,472, Aug. 8, 2018, 6 Pages.
Examiner's Answer to Appeal Brief, U.S. Appl. No. 14/448,472, Oct. 20, 2017, 12 Pages.
Final Rejection, U.S. Appl. No. 12/816,900, dated Jan. 16, 2014, 10 Pages.
Final Rejection, U.S. Appl. No. 14/448,472, dated Dec. 23, 2015, 9 Pages.
Final Rejection, U.S. Appl. No. 14/448,472, dated Jan. 6, 2017, 11 Pages.
Issue Notification, U.S. Appl. No. 12/816,900, dated Jul. 16, 2014, 1 Page.
Issue Notification, U.S. Appl. No. 14/448,472, dated Mar. 19, 2019, 1 page.
Non Final Rejection, U.S. Appl. No. 14/448,472, dated Aug. 24, 2016, 11 Pages.
Non Final Rejection, U.S. Appl. No. 14/448,472, dated Jul. 28, 2015, 8 Pages.
Non-Final Rejection, U.S. Appl. No. 12/816,900, dated Jan. 29, 2013, 17 Pages.
Notice of Allowance and Fees Due, U.S. Appl. No. 12/816,900, dated Mar. 24, 2014, 9 Pages.
Notice of Allowance, U.S. Appl. No. 14/448,472, dated Sep. 13, 2018, 7 Pages.
Notice Regarding Non-Compliant Amendment, U.S. Appl. No. 12/816,900, dated Sep. 6, 2013, 2 Pages.
Requirement for Restriction/Election, U.S. Appl. No. 12/816,900 dated Sep. 18, 2012, 6 Pages.
Response After Final Office Action, U.S. Appl. No. 12/816,900, dated Mar. 17, 2014, 8 Pages.
Response to Election/Restriction, U.S. Appl. No. 12/816,900, dated Nov. 19, 2012, 6 pages.
U.S. Appl. No. 61/454,894, filed Mar. 21, 2011, Inventor: Rothkopf.
U.S. Appl. No. 61/454,936, filed Mar. 21, 2011, Inventor: Myers.
U.S. Appl. No. 61/454,950, filed Mar. 21, 2011, Inventor: Lynch.

* cited by examiner

TOUCH-SCREEN PANEL WITH MULTIPLE SENSE UNITS AND RELATED METHODS

TECHNICAL FIELD

The present subject matter relates to detecting the position of a touch with a position sensor.

BACKGROUND

A position sensor is a device that can detect the presence and location of a touch by a user's finger or by an object, such as a stylus, for example, within a display area of the position sensor display screen. In a touch sensitive display application, the position sensor enables a user to interact directly with what is displayed on the screen, rather than indirectly with a mouse or touchpad. Position sensors can be attached to or provided as part of computers, personal digital assistants (PDAs), satellite navigation devices, mobile telephones, portable media players, portable game consoles, public information kiosks, and point of sale systems, and the like. Position sensors have also been used as control panels on various appliances.

There are a number of different types of position sensors/touch screens, such as resistive touch screens, surface acoustic wave touch screens, capacitive touch screens, and the like. A capacitive touch screen, for example, includes an insulator, coated with a transparent conductor. When an object, such as a user's finger or a stylus, touches or is provided in close proximity to the surface of the screen there is a change in capacitance. This change in capacitance is sent to a controller for processing to determine the position of the touch.

An array of drive (in one example X) electrodes and sense (in this example Y) electrodes of conductive material can be used to form a touch screen having a plurality of nodes, a node being formed at each intersection of X and Y electrodes. Applying a voltage to the array of electrodes creates a grid of capacitors. When an object touches or is provided in close proximity to the surface of the screen, the capacitance change at every individual point on the grid can be measured to determine the location of the touch.

SUMMARY

This detailed description and drawings disclose examples of systems, methods, and articles of manufacture, related to touch position sensors and uses of such sensors. The disclosed technologies, for example, may improve in the accuracy with which position of a touch is detected in certain regions of the position sensor. Multiple panels can be arranged adjacent to one another and one or more sense or drives lines associated with each respective panel can be associated with a control circuit of the other adjacent panel.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

Figure 1:
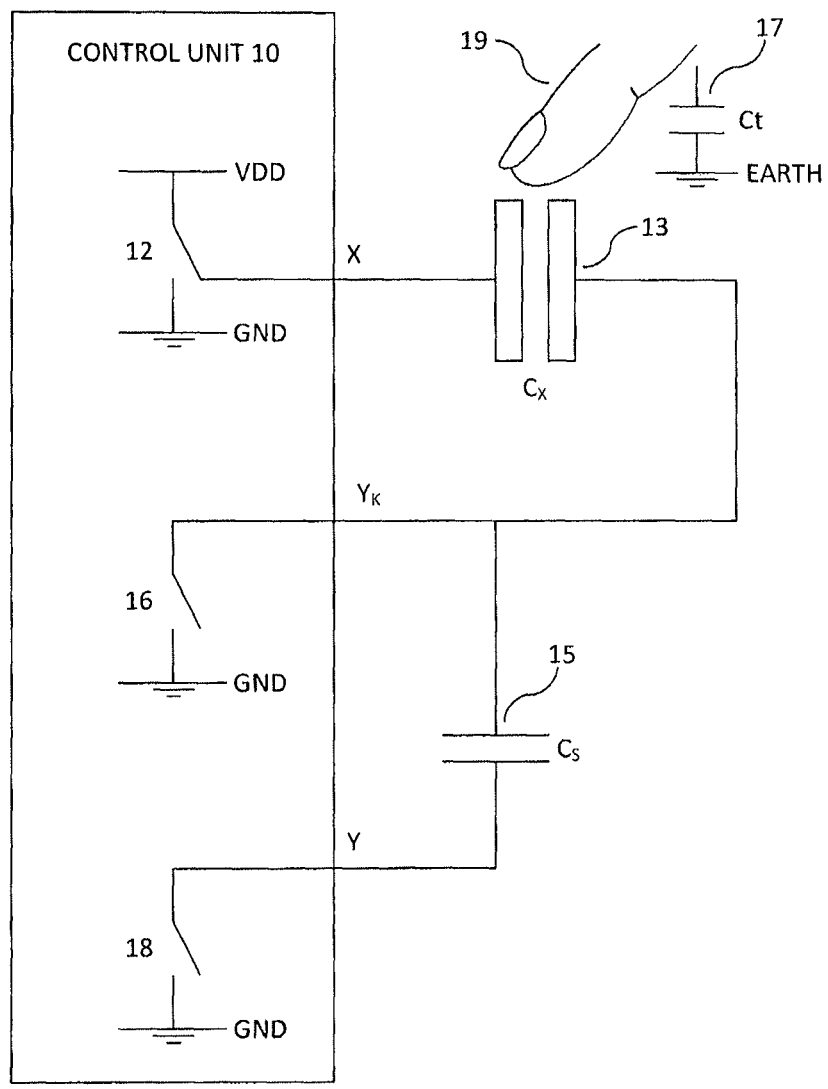
FIG. 1 schematically illustrates an example of an apparatus for detecting a touch.

Reference now is made in detail to the examples illustrated in the accompanying figures and discussed below. FIG. 1 schematically illustrates an example of an apparatus for detecting a touch and determining the location of the touch. The apparatus includes a control unit 10 provided with three switches 12, 16, and 18. Control unit 10 may be a microcontroller, a microprocessor, a programmable logic device/array, an application-specific integrated circuit (ASIC), or a combination thereof. Switch 12 is provided between VDD and ground and is also connected to a sensor 13. The self coupling capacitance of the sensor 13 is $C_X$. The sensor 13 has two electrodes, an X (drive) electrode and a Y (sense) electrode. The apparatus measures the transverse coupling capacitance between the X and Y electrodes.

The sensor 13 is connected in series to a sampling capacitor 15 having a sampling capacitance $C_S$. The sampling capacitor 15 may have a sampling capacitance CS which is considerably larger than the sensor capacitance $C_X$. In one example, the sampling capacitance $C_S$ is at least 1000 times larger than the sensor capacitance $C_X$, where the sensor capacitance $C_X$ may be around 1 pF to 10 pF. The sampling capacitor 15 is also connected in series to the switches 16 and 18, both of which are connected to ground.

Capacitance C is a measure of the amount of electric charge stored for a given electric potential.

$$C = \frac{Q}{V}$$

Where V is the voltage between the plates and Q is charge.

Figure 2:
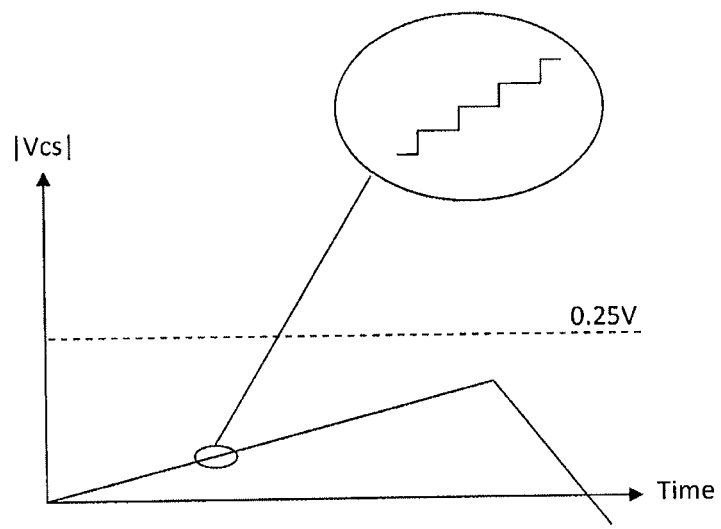
FIG. 2 illustrates an example of time that may be required to charge and discharge the apparatus of FIG. 1.

After opening switch 16, a voltage pulse is applied to the apparatus, by adjusting switch 12 to connect the sensor 13 to VDD, followed by closing switch 18 which causes charge to flow through $C_X$ into $C_S$, accumulating charge at $C_X$ and $C_S$. The sensor capacitance $C_X$ is then discharged, by, opening switch 18 closing switch 16 and adjusting switch 12 to connect to ground. Since only the sensor capacitance $C_X$ is discharged after each voltage pulse, the capacitance $C_S$ held at the sampling capacitor 15 is increased with each voltage pulse. This step wise increase is illustrated in FIG. 2, where $V_{CS}$ is the voltage accumulated at the sampling capacitor 15.

A predetermined number of voltage pulses is applied to the apparatus. After the predetermined number of pulses is applied to the apparatus, the capacitance $C_S$ accumulated in the sampling capacitor 15 is discharged. The time taken for the capacitance to discharge to a reference voltage is measured.

Figure 3:
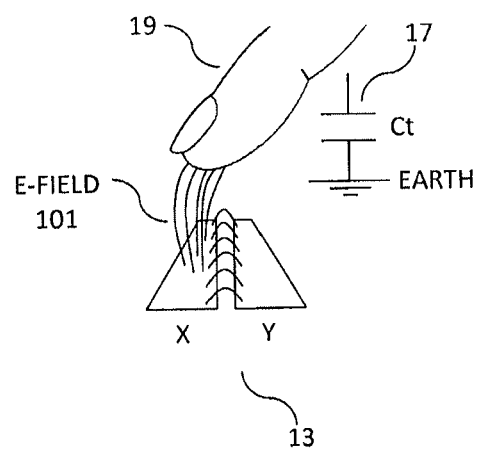
FIG. 3 represents an example of changes in an electric field when a finger is present.

As illustrated in FIG. 3, when a user's finger 19, which has a touch capacitance to Earth $C_f$, is moved close to (or contacts) the sensor 13, the finger 19 diverts charge away from the drive electrode of $C_X$ to earth so that the capacitance $C_S$ accumulated in the sampling capacitor 15 with each voltage pulse is reduced. In one example, the sensor 13 is provided behind a dielectric panel so the finger 19 does not directly contact the sensor 13. In another example, or in addition to a dielectric panel, the finger 19 may be provided in close proximity to the sensor 13, but not directly contacting the sensor 13.

Figure 4A:
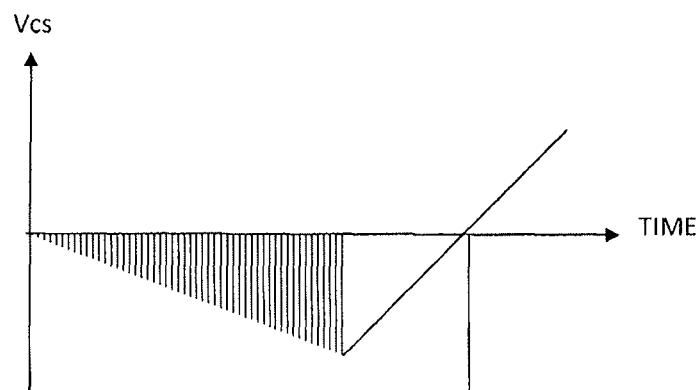
FIG. 4A illustrates an example of time that may be required to charge and discharge the apparatus of FIG. 1, when there is no touch.
Figure 4B:
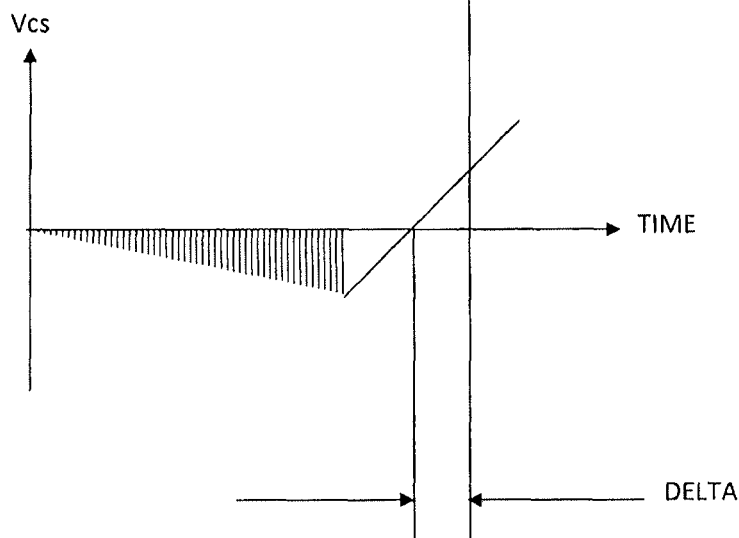
FIG. 4B illustrates an example of time that may be required to charge and discharge the apparatus of FIG. 1, when there is a touch.

FIG. 4A illustrates the voltage $V_{CS}$ accumulated at the sampling capacitor 15 after the predetermined number of pulses when there is no touch, and the time required to discharge the sampling capacitor 15. FIG. 4B illustrates the voltage $V_{CS}$ accumulated at the sampling capacitor 15 after the predetermined number of pulses when a user's finger 19 is close to the sensor 13 (i.e. when there is a touch), and the time required to discharge the sampling capacitor 15. Since the sampling capacitor 15 is connected to the negative side of the sensor 13, in the example, the accumulated voltage $V_{CS}$ has a negative value.

As can be seen from FIGS. 4A and 4B, the voltage $V_{CS}$ accumulated in FIG. 4B is reduced when compared to the voltage $V_{CS}$ accumulated in FIG. 4A. In addition, the time required to discharge the sampling capacitor 15 in FIG. 4B is reduced when compared to the time required to discharge the sampling capacitor 15 in FIG. 4A. The reduction in time required to discharge the sampling capacitor 15 in FIG. 4B indicates that there is a touch. The difference between the time required to discharge the sampling capacitor 15 when there is no touch (illustrated in FIG. 4A) and the time required to discharge the sampling capacitor when there is a touch (illustrated in FIG. 4B) is referred to as a delta.

The detection of a delta indicates a touch, because the delta indicates that there has been a change of charge accumulated at the sampling capacitor 15, when compared to the amount of charge expected to be accumulated at the sampling capacitor 15 when there is no touch.

Figure 5:
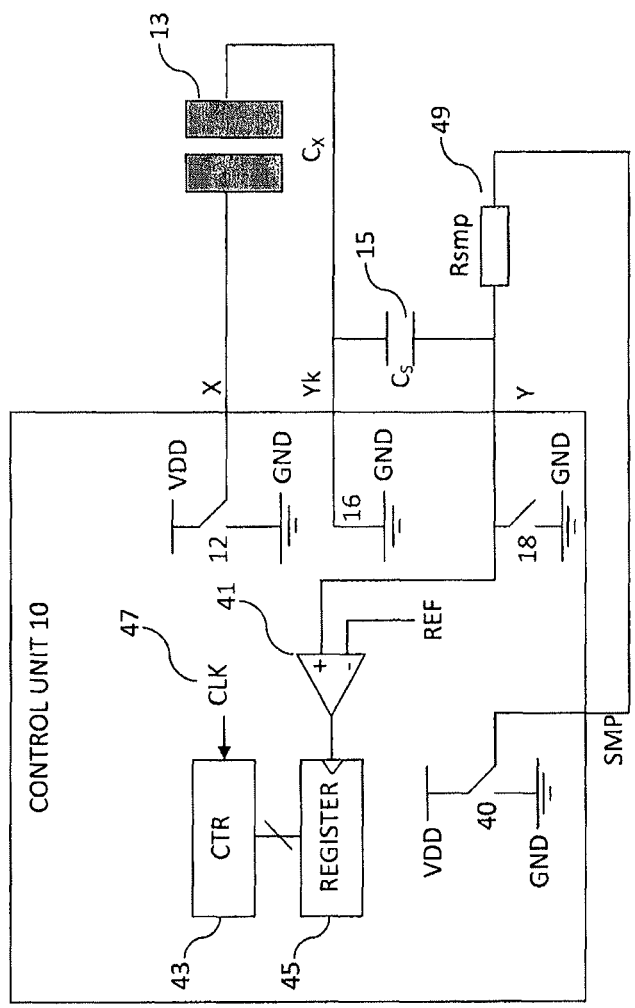
FIG. 5 illustrates schematically an example of a basic measurement circuit.

FIG. 5 illustrates a basic circuit for measuring the magnitude of Vcs. The control unit 10 of FIG. 1 includes a resistor 49, switch 40, a comparator 41, a register 45, a counter 43 and a clock signal 47. The resistor 49, comparator 41 and counter 43 are used to measure the magnitude of Yes. The time required to discharge the sampling capacitor to a reference voltage is measured with the counter and the comparator, such that the counter value is the measurement.

Figure 6:
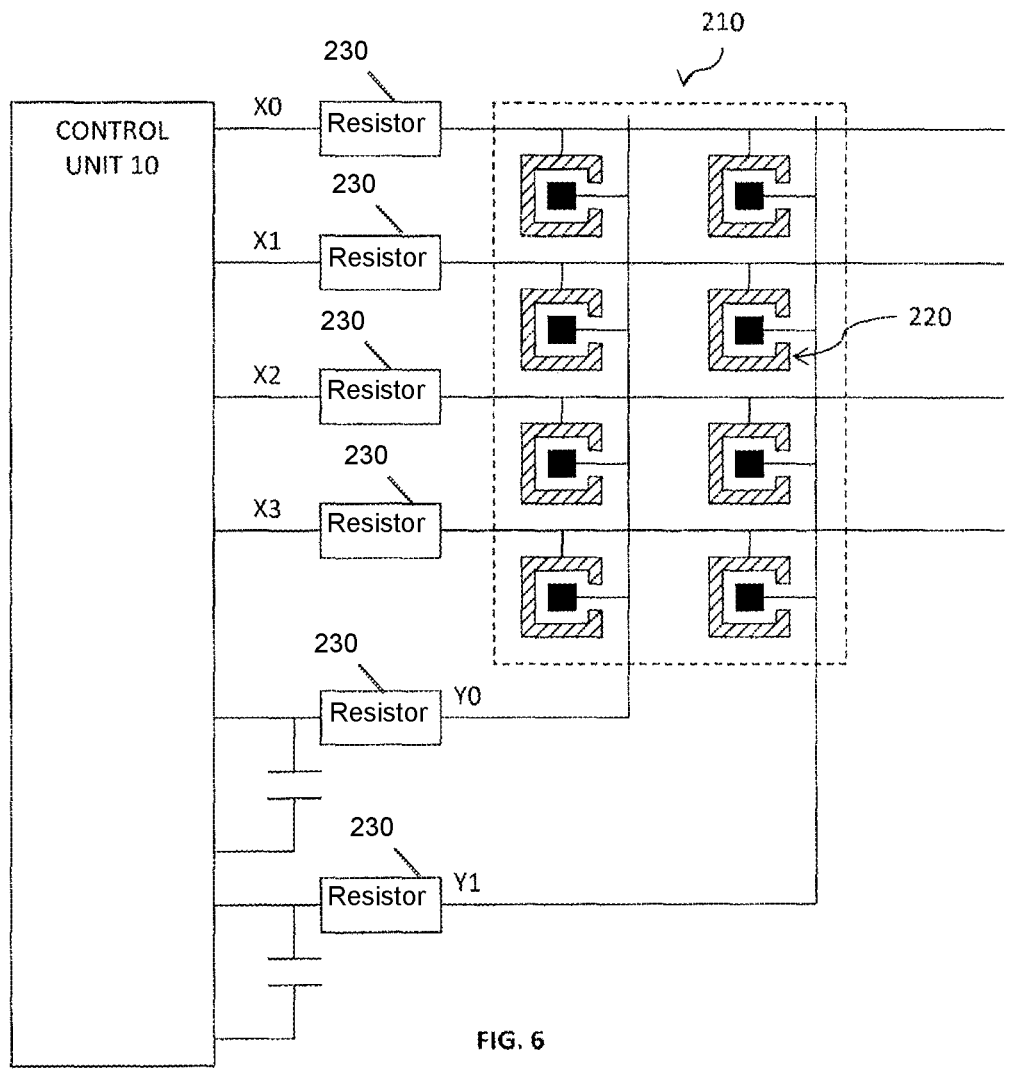
FIG. 6 illustrates schematically an example of a two-dimensional arrangement for sensing position of a touch.

As illustrated in FIG. 6, in order to create a position sensor having more than one touch sensor 13, a plurality of drive and sense electrodes can be provided to create an array of sensing elements 220 (touch sensors 13) within a panel 210 of the position sensor. The drive electrodes (X) form one plate of each sensor 13 and the sense (Y) electrodes form the other plate of each sensor 13 having a capacitance $C_X$. The position sensor also includes a plurality of resistors 230, which may have different values, and a control unit 10. FIG. 6, illustrates one exemplary matrix of eight sensing elements 220, however many other configurations are possible.

The matrix of drive and sense electrodes forms a two-dimensional position sensor capable of sensing the position of a touch. The control unit 10 uses a scanning sequence through the rows of drive electrodes and the columns of sense electrodes to measure coupling capacitance at the intersections or nodes. Examples of position sensors include touch screens and touch pads, which can be provided attached to or as part of computers, personal digital assistants (PDA), satellite navigation devices, mobile phones, portable media players, portable game consoles, public information kiosks, and point of sale systems, and the like. Position sensors can also be used as control panels on various appliances.

Figure 7:
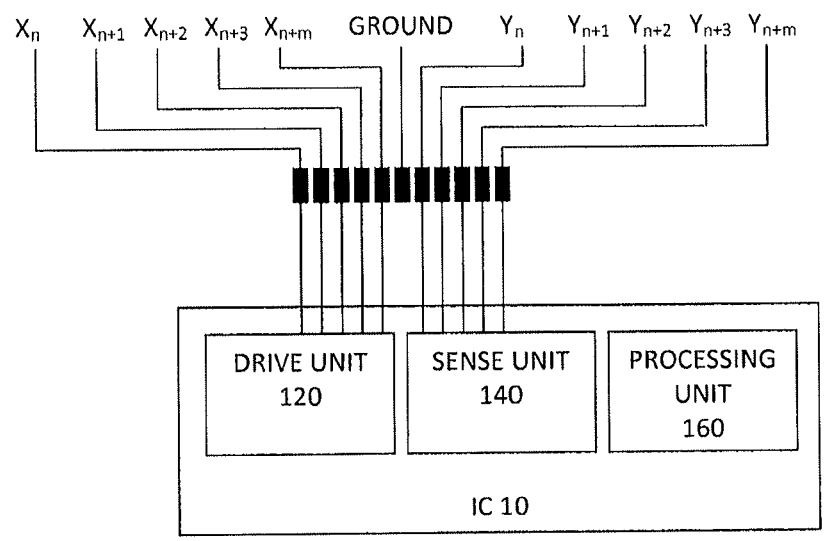
FIG. 7 illustrates schematically an example of connection of touch sense lines and drive lines to a control integrated circuit (IC)

FIG. 7 illustrates schematically the drive channels Xn, Xn+1, Xn+2, . . . Xn+m connected to a drive unit 120 of a control integrated circuit (IC) 10 and sense channels Yn, Yn+1, Yn+2, . . . Yn+m connected to a sense unit 140. Drive unit 120 supplies drive signals to the drive electrodes and sense unit 140 receives signals from the sense electrodes. Additionally, control IC 10 of this example controls processing of signals from the sense unit 140 in the processing unit 160 to determine the position of a touch based on the signals received from the sense electrodes, although it will be appreciated that processing unit 160 is not necessarily provided on control IC 10, and may be provided by other control means such as a separate processing IC. Running drive channels and sense channels close to one another can create a FALSE sensing condition, however this can be avoided by running a ground line between the two channels.

Figure 8:
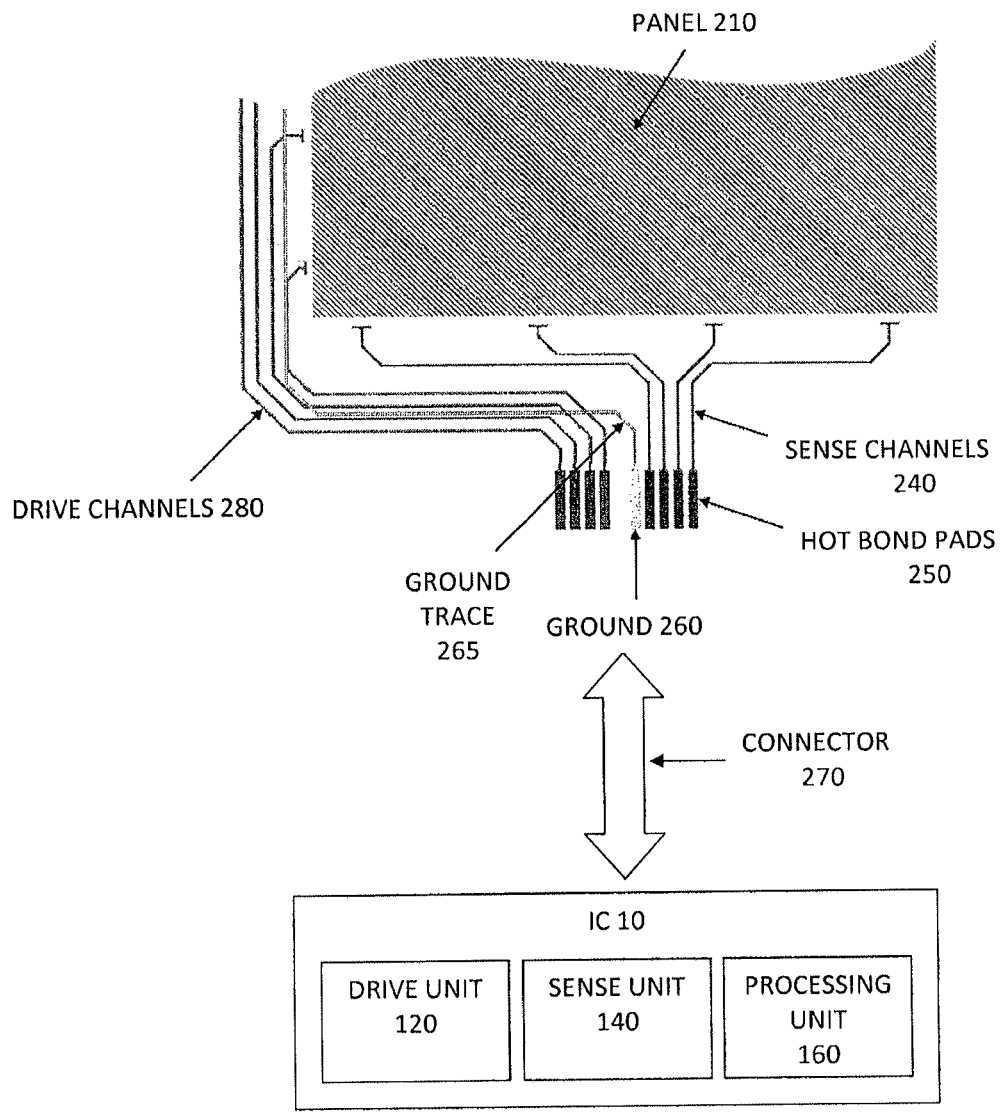
FIG. 8 illustrates schematically in more detail an example of connection of sensing and driving lines to a control IC.

The connections of FIG. 7 are illustrated in more detail in FIG. 8 which illustrates schematically an exemplary panel 210 including a plurality of drive electrodes connected to drive channels 280 and a plurality of sense electrodes connected to sense channels 240. The drive channels 280 and the sense channels 240 are connected to a control IC 10 via a connector 270. The connector 270 may be, for example, a conductive trace or a feed-through.

In this example, control IC chip 10 is large enough to accommodate each of the drive and sense channels 240, 280 associated with the panel. In order to do this, the number of drive and sense channels, and therefore the number of sensing elements, may be kept constant but spaced increasingly further apart as the panel size increases. However, this results in a reduction in sensitivity and accuracy of touch detection. Alternatively, the size of the chip may be increased to increase the number of drive and/or sense channels that the chip can accommodate. However, this means that the size of control IC chip 10 is dictated by the panel size, which may increase cost in manufacturing chips of different and/or unusual parameters.

Figure 9:
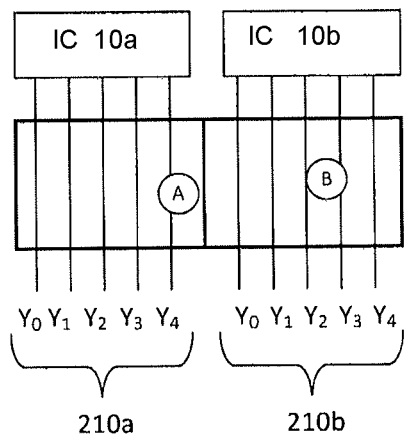
FIG. 9 illustrates schematically an example of a touch-sensitive panel including two panel regions, which are connected to two control ICs.

In order to form a larger panel, two or more panels may be placed side by side, as illustrated by way of example in FIG. 9 in which panels 210a and 210b, with associated control ICs 10a and 10b, are placed side by side. ICs 10a and 10b each have an associated sensing channel set, which in this example includes sensing channels Y0-Y4, although it will be appreciated that each channel set may independently have more or fewer channels (sensing channels Y0-Y4 of each panel are shown, however driving lines are not shown for simplicity of illustration). However, touch detection at the edges of side-by-side panels may be less accurate than touch detection towards the center of the panel because a touch at the edge of the panel is sensed by fewer sensing channels than a touch in the center of a panel. By way of example in FIG. 9, touch (B), in the center of panel region 210b, is sensed by two sensing channels (Y2 and Y3 associated with IC 10b) whereas touch (A) at the overlap of panels 210a and 210b is sensed by only one sensing line (Y4 of the channel set associated with IC 10a).

Figure 10:
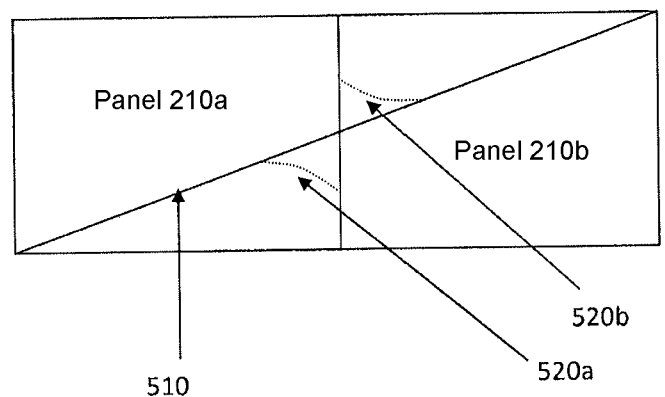
FIG. 10 illustrates schematically an example of deviation that may occur between sensed and actual touch positions in the panel of FIG. 9.

The loss of accuracy at the dividing line between panels 210a and 210b, can be seen in FIG. 10. In that example, line 510 represents the positions of an actual touch, for example, if the user moves her finger to run along panels 210a and 210b. The lines 520a and 520b respectively represent the position that may be sensed by IC 10a and IC 10b and show the deviation of the position detections from the actual positions where the touch at points along the line 510 are near the edge of the channel sets.

Figure 11:
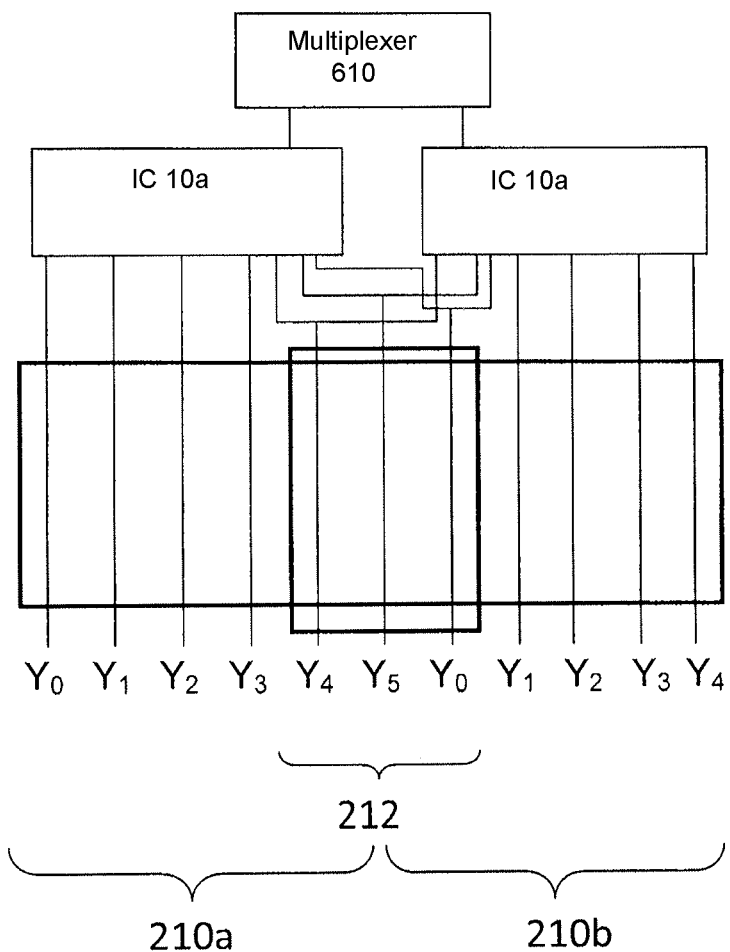
FIG. 11 schematically illustrates an example of a touch-sensitive panel including two panel regions connected to two control ICs, where the panel includes an overlap region in which sensing channels are connected to both control ICs.

FIG. 11 illustrates schematically a panel 210 including panel regions 210a and 210b, and control ICs 10a and 10b associated with panel regions 10a and 10b. In this example, three sensing channels (Y4, Y5 and Y0) in an overlap region 212 are included in the sensing channel sets of both control ICs 10a and 10b. That is, the control IC 10a communicates with sensing channels Y0, Y1, Y2, Y3, Y4, Y5 (of panel region 210a), and communicates with a second Y0 (of panel region 210b). Similarly, control IC 10b communications sensing channels Y4 (of panel region 210a), Y5, Y0, Y1, Y2, Y3 (of panel region 210b), and a second Y4 (of panel region 210b). Each control IC 10a, 10b is connected to each sense channel of the respective control ICs panel (e.g., 210a) and one or more channels of the other control ICs panel (e.g., 210b), so that some number of the sense channels (in this example three) connect to both control ICs 10a, 10b. More specifically, the control IC 10a connects to sense channels Y0-Y5 of the associated panel region 210a. Similarly, the control IC 10b connects to sense channels Y0-Y5 of the associated panel region 210b. In addition, the sense unit in IC 10a connects to sense channel(s) Y0 of the second panel region 210b, and the sense unit in IC 10b connects to sense channels Y4 of the first panel region 210a. Thus, sense channels Y4, Y5, and Y0 in region 212 are common to both control ICs 10a, 10b.

The width of the overlap area may be selected based on the size of the target to be detected (e.g., a human finger or a stylus). For example, the width of the overlap area may be up to 3 cm, up to 1 cm or up to 0.5 cm. Other widths can also be used depending on the application. The panel 210 may be formed of two separate substrates placed side-by-side or may be formed of a single substrate that is divided into multiple panel regions.

Figure 14:
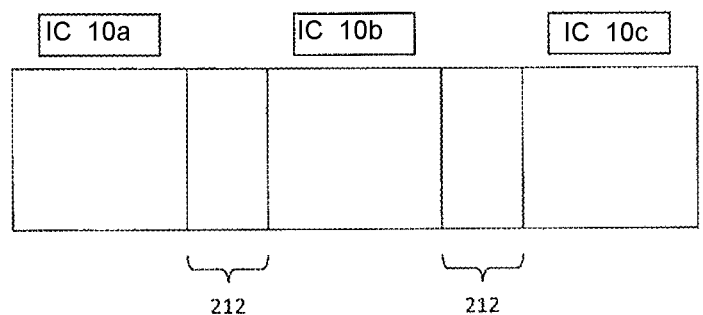
FIG. 14 illustrates schematically another exemplary panel including three regions connected to three control ICs, with two overlap regions in which sensing channels are connected to two of the control ICs.

The example of FIG. 11 illustrates a panel and two ICs 10a and 10b (which may or may not be housed within the panel) with associated sensing channel sets, however any number of ICs and channel sets may be combined to form a panel of any desired shape or size. As discussed more below, the example in FIG. 14 has three ICs (10a, 10b and 10c) for connection to three associated driving and sensing channel sets (not shown) and three panel regions. Further exemplary configurations are shown and described below with respect to FIG. 16 and FIG. 17. Further details of those configurations are provided below.

FIG. 11 illustrates an embodiment of touch position sensor. The sensor includes a panel having a first panel region 210a and a second panel region 210b. The first panel region 210a includes a plurality of first sense channels. The second lane region 210B is positioned adjacent to the first panel region 210b. The second panel region 210b includes a second plurality of sense channels. The sensor also includes a first sense unit 10a in communication with the plurality of first sense channels and at least one sense channel of the second plurality of sense channels. The sensor also includes a second sense unit 10b in communication with the second plurality of sense channels and at least one sense channel of the first plurality of sense channels.

Figure 12:
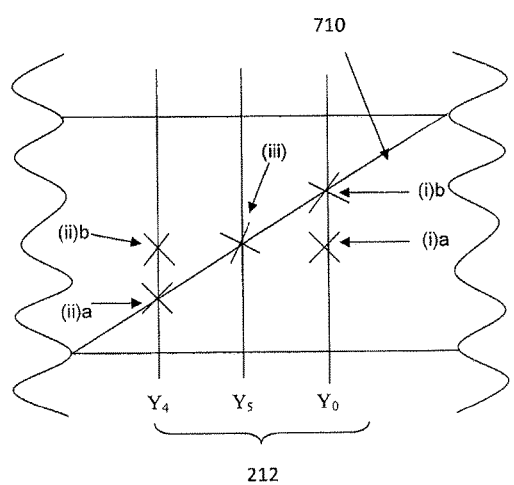
FIG. 12 illustrates schematically an example of deviation that may occur between sensed and actual touch positions in the panel of FIG. 11.

With reference to FIGS. 11 and 12, line 710 illustrates the actual position of a touch crossing the overlap region 212 of panel 210. In the event of a touch in the overlap region 212, the sense units 140 of ICs 10a and 10b will each detect a touch, however the two sensing channel sets may each detect a different touch position due to the aforementioned deviation for touch positions at or near the outermost sensing channels of the channel set associated with each IC 10. Thus, a touch (i) near the edge of panel region 210a, may be sensed by IC 10a at position (i)a, which is some distance from the actual touch position, especially if the touch is only sensed by the outermost sensing channel associated with IC 10a, whereas IC 10b may sense the same touch more accurately at position (i)b because the touch is further away from the outermost sensing channel associated with IC 10b. The converse is true for touches near the edge of panel region 210b, illustrated as a touch (ii) sensed by the two channel sets at positions (ii)a and (ii)b. Touches at the center of the overlap region (illustrated as touch (iii)) will be sensed in the same position by both IC 10a and 10b. In this way, non-linearities in the position of a sensed touch near the panel region boundaries and/or as the touching object is moving from one channel set to an adjacent channel set may be reduced or eliminated when compared to situations without overlapping sense channels between the panel regions 210a and 210b.

Referring back to FIG. 11, a multiplexer 610, which includes the ability to process signals, may be used to determine which one of the reported touches to select as accurate and which one(s) to discard as inaccurate when the sensing channel sets of both IC 10a and 10b detect a touch in different positions in the overlap region. If one or both of the ICs 10a and 10b do not include a processing unit 160 then the multiplexer 610 may also perform processing of signals received from the sensing channels to determine a touch position. Multiplexer 610 may be, for example, an integrated circuit chip such as an ASIC. Alternatively, multiplexer 610 may be a processor running software containing code to operate this process.

In one arrangement, the sensing channel sets are scanned sequentially in which case each sensing channel in the overlap region is scanned only once in each scanning cycle. For example, multiplexer 610, sense unit 140 or a separate control element may be configured so that this sequential scanning is synchronized across the two. In another arrangement, one of ICs 10a and 10b scans each of the respective IC's associated sensing channel sets and the other of ICs 10a and 10b then scans each of that IC's associated sensing channels (in other words, sensing channels in the overlap region are each scanned twice within the same scanning cycle).

Figure 13:
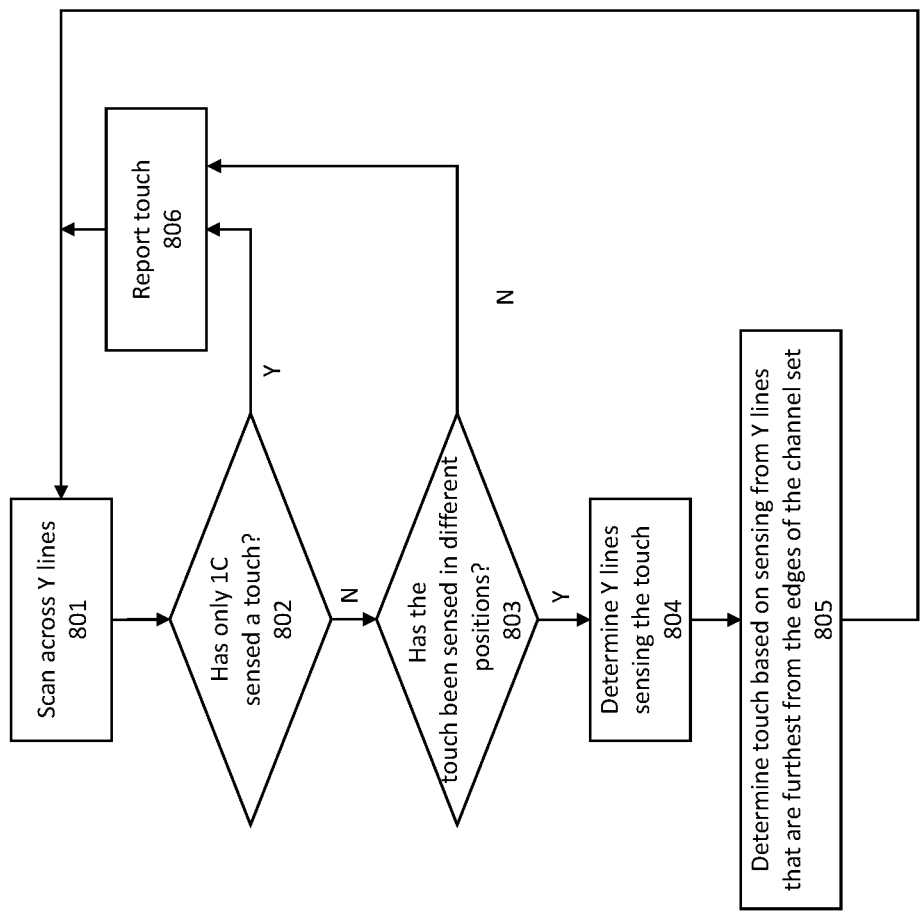
FIG. 13 illustrates an exemplary process of sensing and reporting a touch.

FIG. 13 illustrates an exemplary process of determining the position of a touch in the event of a touch in the overlap region, for example, in a system like that of FIG. 11. The process begins by scanning (step 801) across the Y sense lines. When a touch is detected, processing branches at step 803 based on whether the touch is detected by only IC. If only one IC 10 senses the touch (step 802) then the process branches to step 806 where there is a report of the detection and position based on sensing and processing through the one IC 10, and then the process ends until the next cycle. However, if multiple ICs sense a touch, then the process branches from 803 to determine whether the touch is sensed in different positions (step 803). If the touch is sensed in the same position by the multiple ICs 10, the process branches to step 806 where there is a report of the detection and position, and the process ends until the next cycle.

However, if both ICs associated with an overlap region report a touch, and the sensed touches are in different positions then the process continues from step 803 to step 804. When the touch is sensed in different positions, the Y sense lines sensing the touch are determined by the multiple ICs (step 804). The touch location is reported (step 805) based on the touch as sensed by the Y line or Y lines that are furthest from the edges of the channel set containing the sensing Y line or lines. Other methods can be used to determine the location of the touch.

Figure 15:
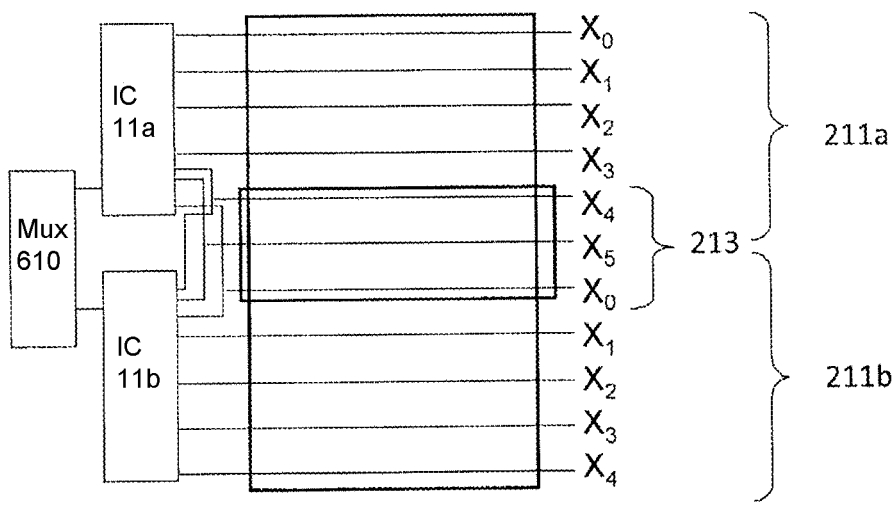
FIG. 15 illustrates schematically an exemplary panel including regions connected to two control ICs and having an overlap region in which drive channels are connected to both control ICs.

The above examples illustrate arrangements in which a plurality of sensing channels are common to more than one IC. It will be appreciated that analogous examples may be provided in which a plurality of drive channels are common to more than one IC. This is illustrated by way of another example in FIG. 15, which shows schematically a panel 211 include two panel regions 211a and 211b, and two control ICs 11a and 11b associated with a respective drive channel set in panel regions 211a and 211b. In this example, three drive channels (X4, X5 and X0) in an overlap region 213 are included in the drive channel sets of both control ICs 11a and 11b. That is, the drive channel set associate with control IC 11 a includes drive channels X0 (of panel region 211a), X1, X2, X3, X4, X5 (of panel region 211b), and a second X0 (of panel region 211b). The drive channel set associated with the second control IC 11b includes X4 (of panel region 211a), X5, X0 X1, X2, X3, and a second X4 (of panel region 211b). Each control IC 11a, 11b is connected to each drive channel of the respective control ICs panel (e.g., 211a) and one or more drive channels of the other control ICs panel (e.g., 211b), so that some number of the drives channels (in this example three) connect to both control ICs 11a, 11b. More specifically, the control IC 11a connects to drive channels X0-X5 of the associated panel region 211a. Similarly, the control IC 11b connects to drive channels X0-X5 of the associated panel region 211b. In addition, the drive unit in IC 11a connects to drive channel(s) X0 of the second panel region 211b, and the drive unit in IC 11b connects to drive channels Y4 of the first panel region 211a. Thus, drive channels Y4, Y5, and Y0 in region 213 are common to both control ICs 11a, 11b.

Figure 16:
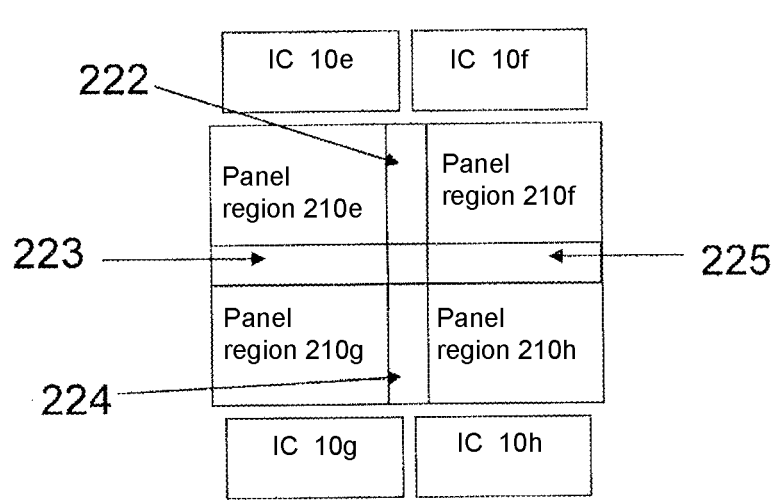
FIG. 16 illustrates schematically an exemplary panel including overlap regions in which drive channels are connected to two control ICs and overlap regions in which sensing channels are connected to two control ICs.
Figure 17:
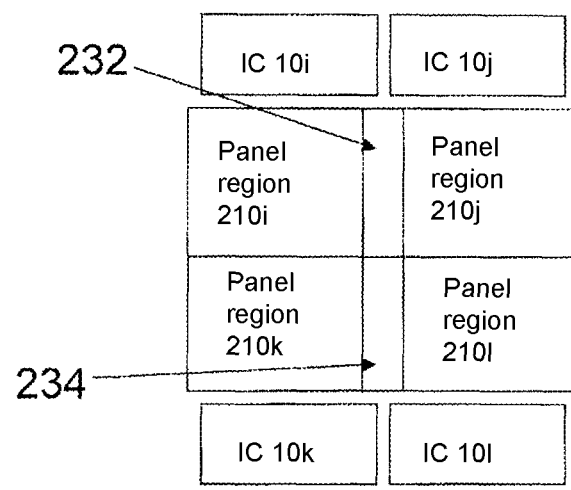
FIG. 17 illustrates schematically an exemplary panel including overlap regions in which sensing channels in overlap regions are connected to two control ICs and drive channels sets do not form an overlap region.

FIG. 16 illustrates a further example in which multiple ICs are used to extend a panel area both lengthwise and widthwise. Here, the panel 10 has panel regions 210e, 210f, 210g and 210h (each panel region could also be a separate panel) and control ICs 10e, 10f, 10g and 10h. Control ICs 10e and 10f are connected to common sensing channels (not shown) in overlap region 222; control ICs 10e and 10g are connected to common drive channels (not shown) in overlap region 223; control ICs 10g and 10h are connected to common sensing channels in overlap region 224; and control ICs 10f and 10h are connected to common drive channels in overlap region 225. In this case, overlap regions may be provided for both driving channels and sensing channels associated with multiple driving channels sets and multiple sensing channel sets respectively.

In yet another example, a panel is extended both lengthwise and widthwise by providing a plurality of sensing channels that are common to more than one control IC, but wherein drive channels are associated with only one control IC. This is illustrated schematically in FIG. 17, the panel 10 includes panel regions 210i, 210j, 210k and 210l and control ICs 10i, 10j, 10k and 10l. Control ICs 10i and 10j are connected to common sensing channels (not shown) in overlap region 232, as are control ICs 10k and 10l with respect to common sensing channels in overlap region 234. In this example, there are no driving channels common to more than one IC.

Figure 18:
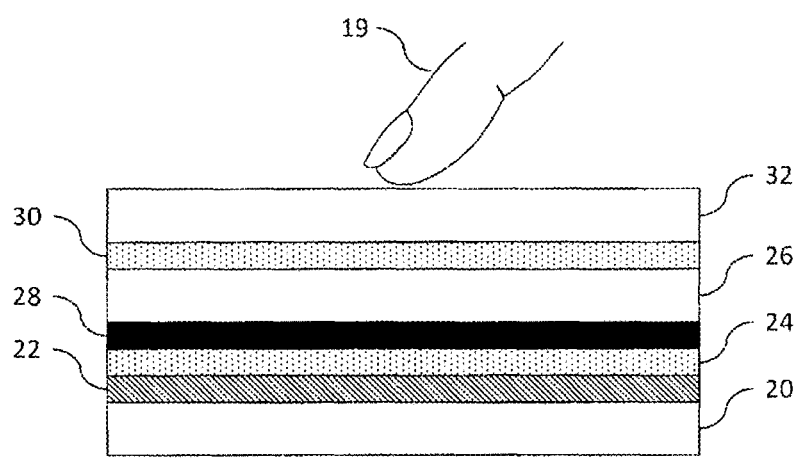
FIG. 18 illustrates schematically a layer arrangement of an exemplary panel.

FIG. 18 illustrates an exemplary stack arrangement which can be used to manufacture a panel for a position sensor. The stack includes a lower substrate 20; a drive electrode 22; an adhesive layer 24; a sense electrode 28; an upper substrate 26; an adhesive layer 30 and a front panel 32. In one example, the drive electrode 22 is the X electrode and the sense electrode 28 is the Y electrode. In one example, the lower substrate 20 and the upper substrate 26 are polyethylene terephthalate (PET), and the drive and sense electrodes 22, 28 are indium tin oxide (ITO). In another example, the substrate 20 is glass. In one example, the adhesive 24, 30 is an optically clear adhesive. In one example, the upper substrate 26 is PET, and the drive and sense electrodes 22, 28 are ITO. In another example, the substrate 20 is glass. The adhesive of layer 24 is an optically clear adhesive. In one example, the drive electrode 22 is fabricated on the lower substrate 20 and the sense electrode 28 is fabricated on the upper substrate 26.

Figure 19:
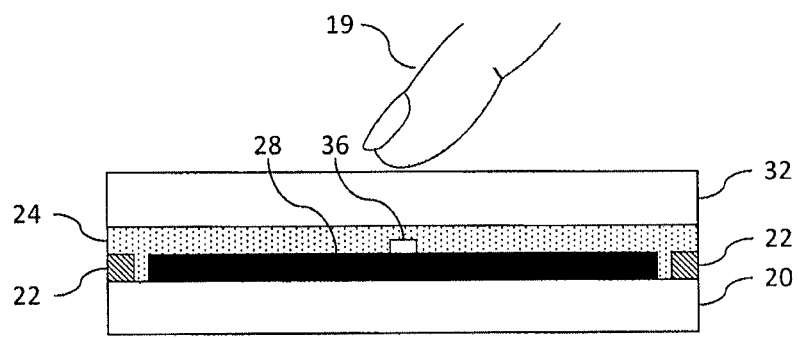
FIG. 19 illustrates schematically a layer arrangement for another exemplary panel.

Drive and sense electrodes may be provided on different layers, as illustrated in FIG. 18, or the drive and sense electrodes may be provided on the same layer, as illustrated in FIG. 19. Crossovers 36 are used at the point of intersection with a dielectric insulator to prevent shorting. The stack includes an substrate 20; a drive electrode 22; a sense electrode 28; a crossover 36; an adhesive layer 24 and a front panel 32. In one example, the drive electrode 22 is the X electrode and the sense electrode 28 is the Y electrode.

Figure 20:
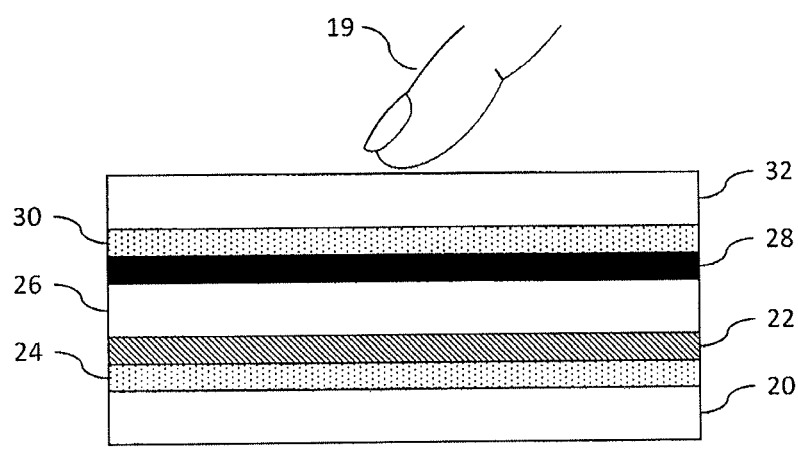
FIG. 20 illustrates schematically a layer arrangement for another exemplary panel.

FIG. 20 illustrates another stack arrangement which can be used to manufacture a panel for a position sensor where the drive and sense electrodes 22, 28 are provided on either side of the upper substrate 26.

The position sensors described above can be attached to numerous electronic devices, such as computers, personal digital assistants (PDA), satellite navigation devices, mobile phones, portable media players, portable game consoles, public information kiosks, point of sale systems and the like. Each of these electronic devices may include a central processor or other processing device for executing program instructions, an internal communication bus, various types of memory or storage media (RAM, ROM, EEPROM, cache memory, disk drives, and the like.) for code and data storage, and one or more network interface cards or ports for communication purposes. A touch reported by a position sensor attached to such an electronic device may be processed accordingly by the electronic device, for example to change a display depending on the sensed position of the touch.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

What is claimed is:

1. A panel for a touch position sensor, comprising:
   a first panel region including a plurality of first touch sense channels for communication with a first sense unit; and
   a second panel region adjacent to the first panel region, the second panel region including a plurality of second touch sense channels for communication with a second sense unit, wherein:
   at least one touch sense channel associated with the first panel region and at least one touch sense channel associated with the second panel region are directly coupled to each of the first sense unit and the second sense unit.

2. The panel according to claim 1, wherein the first and second panel regions overlap in a region having a width that is based on a size of an object to sense.

3. The panel according to claim 2, wherein the width is substantially 3 cm.

4. The panel according to claim 2, wherein the width is substantially 1 cm.

5. The panel according to claim 2, wherein the width is substantially 0.5 cm.

6. A touch position sensor, comprising:
   a panel comprising:
   a first panel region including a plurality of first touch sense channels; and
   a second panel region substantially adjacent to the first panel region, the second panel region including a plurality of second touch sense channels;
   a first sense unit in communication with the plurality of first touch sense channels and at least one touch sense channel of the plurality of second touch sense channels, the first sense unit directly coupled to the at least one touch sense channel of the plurality of second touch sense channels; and
   a second sense unit in communication with the plurality of second touch sense channels and at least one touch sense channel of the plurality of first touch sense channels, the second sense unit directly coupled to the at least one touch sense channel of the plurality of first touch sense channels.

7. The touch position sensor of claim 6, wherein the at least one touch sense channel of the plurality of second touch sense channels in communication with first sense unit and the at least one touch sense channel of the first plurality of touch sense channels in communication with the second sense unit are located near the first panel region and the second panel region.

8. The touch position sensor of claim 6, further comprising a first processing unit in communication with the first sense unit and a second processing unit in communication with the second sense unit, the first processing unit and the second processing unit cooperating to determine whether a touch occurred in a region where the second panel region is substantially adjacent to the first panel region.

9. The touch position sensor of claim 8, wherein one of the first processing unit and the second processing unit reports the position of the touch.

10. The touch position sensor of claim 6, further comprising a multiplexer in communication with the first sense unit and the second sense unit, the multiplexer determining the position of a touch.

11. A method for sensing a touch with a position sensor, comprising:
    scanning touch sense lines, the touch sense lines including:
    (a) a plurality of touch sense lines associated with a first sense unit;
    (b) a plurality of touch sense lines associated with a second sense unit; and
    (c) at least two sense lines included in both said pluralities that are each associated with both said sense units and that are directly connected to both sense units, the sense lines associated with both said sense units defining a channel set;
    determining whether a touch has been sensed in different positions;
    when a touch is sensed in different positions, determining the sense lines that sensed the touch; and
    reporting the touch location based on the sensing from the sense lines that are located farthest from the edges of the channel set defined by the sense lines associated with both said sense units.

* * * * *